(No Model.)

E. G. GOLLNER.
MIRROR.

No. 250,229. Patented Nov. 29, 1881.

Witnesses:
James McNamee
D. McCaffrey

Inventor:
Ervin G. Gollner

UNITED STATES PATENT OFFICE.

ERVIN G. GOLLNER, OF NEW YORK, N. Y.

MIRROR.

SPECIFICATION forming part of Letters Patent No. 250,229, dated November 29, 1881.

Application filed January 10, 1881. (No model.)

*To all whom it may concern:*

Be it known that I, ERVIN G. GOLLNER, of the city, county, and State of New York, have invented a new and useful Improvement in Mirrors, of which the following is a specification.

My invention consists of the combination of a mirror and spring-handle, provided with loops for the spring-handle to slide in.

Figure 1:
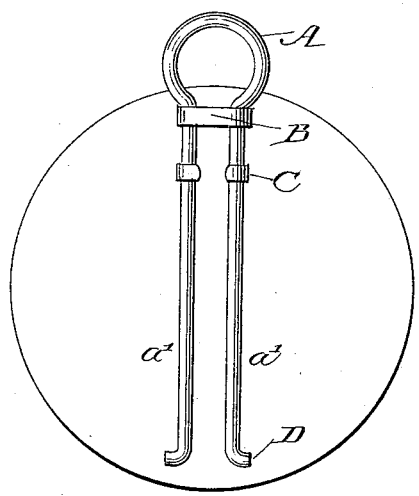
Figure 3:
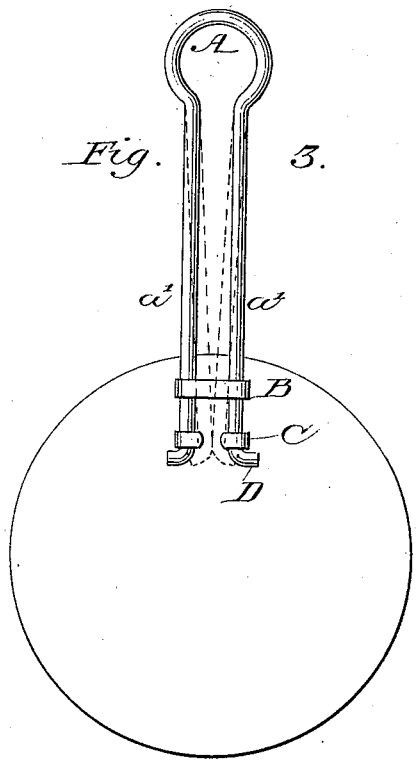
Figure 2:
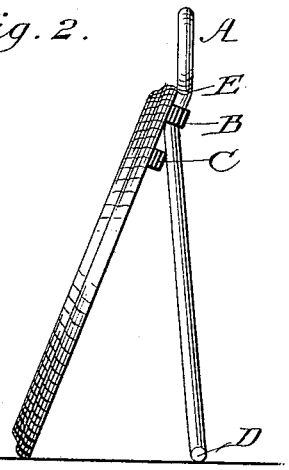
Figure 4:
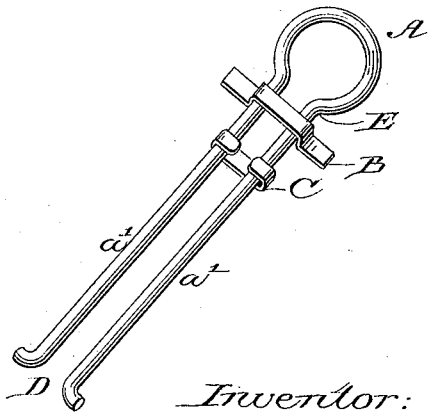

Figure 1 is a rear view of the mirror, with the handle arranged for hanging the mirror upon the wall. Fig. 2 is an edge view of the mirror, with the handle arranged to support the mirror in a standing position. Fig. 3 is a rear view of the mirror, with the handle extended to adapt the device for use as a hand-mirror. Fig. 4 is a detail view, in perspective, of the handle and clamping-loops detached from the mirror.

Similar letters of reference indicate corresponding parts.

A represents the handle, which answers as a brace when it is used as an easel-mirror; also answers for a ring when it is used as a mirror to hang on the wall, and used as a handle for a hand-mirror.

B represents a loop inclosing the handle and fixed to the back of the mirror.

C represents an open clamping-loop arranged on the handle below the loop B, through the opening of which the arms $a'$ $a'$ of the handle may pass when compressed, and then may take the position shown in Fig. 2 for supporting the mirror as a stand.

D D are the out-turned ends of the handle, forming stops to prevent the handle from accidentally pulling through the loops.

E is the bend in the handle to offset it when the mirror is used as a stand.

The combination as a mirror to hang on the wall is shown in Fig. 1. The handle A slides down on the flat surface on the back of the mirror to bend E, which forms a stop against loop B, and then it will leave above the mirror a ring for the purpose of hanging the mirror on the wall. Pressing parts $a'$ $a'$ toward each other till they clear open loops C, then sliding handle A through loop B, bend E will offset parts $a'$ $a'$ sufficient to form the brace for an easel-mirror, as shown in Fig. 2. By sliding out handle A to its full extent stops D D, reaching open slots C, will prevent handle A from pulling out, and at the same time it will form a handle for a hand mirror, as shown in Fig. 3.

Having thus described my invention, I claim as new and desire to secure by Letters Patent—

A mirror having the closed loop B and the open loop C secured to its back, in combination with the spring-handle having the bend E and the arms $a'$ $a'$, provided with stops D D, substantially as shown and described.

ERVIN G. GOLLNER.

Witnesses:
WILLIAM J. NICHOLS,
N. D. REDHEAD.